(12) United States Patent
Tanida et al.

(10) Patent No.: US 10,193,180 B2
(45) Date of Patent: Jan. 29, 2019

(54) METHOD FOR MANUFACTURING LAMINATED ELECTRICAL STORAGE DEVICE

(71) Applicant: Murata Manufacturing Co., Ltd., Nagaokakyo-shi, Kyoto-fu (JP)

(72) Inventors: Masayoshi Tanida, Nagaokakyo (JP); Yoshimasa Yoshino, Nagaokakyo (JP); Kazuyuki Furukawa, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/983,967

(22) Filed: Dec. 30, 2015

(65) Prior Publication Data
US 2016/0111750 A1 Apr. 21, 2016

Related U.S. Application Data

(63) Continuation of application No. PCT/JP2014/069054, filed on Jul. 17, 2014.

(30) Foreign Application Priority Data

Jul. 22, 2013 (JP) .................. 2013-151327

(51) Int. Cl.
*H01M 10/04* (2006.01)
*H01G 11/76* (2013.01)
*H01G 11/80* (2013.01)
*H01G 11/82* (2013.01)
*H01M 2/06* (2006.01)
(Continued)

(52) U.S. Cl.
CPC ............ *H01M 10/04* (2013.01); *H01G 11/76* (2013.01); *H01G 11/80* (2013.01); *H01G 11/82* (2013.01); *H01G 11/84* (2013.01); *H01M 2/0275* (2013.01); *H01M 2/06* (2013.01); *H01M 10/0525* (2013.01); *Y02E 60/13* (2013.01)

(58) Field of Classification Search
None
See application file for complete search history.

(56) References Cited

U.S. PATENT DOCUMENTS

| 6,277,516 B1 | 8/2001 | Sasaki et al. |
| 2008/0206636 A1* | 8/2008 | Sanada ............... H01M 2/00 429/185 |

FOREIGN PATENT DOCUMENTS

| JP | H11-312514 A | 11/1999 |
| JP | 2003-331798 A | 11/2003 |

(Continued)

OTHER PUBLICATIONS

International Search Report issued for PCT/JP2014/069054, dated Sep. 2, 2014.

(Continued)

*Primary Examiner* — Wyatt P McConnell
(74) *Attorney, Agent, or Firm* — Arent Fox LLP (57) ABSTRACT

A method for manufacturing a laminated electrical storage device, the method including heating an external terminal by a heater that is not in contact with the external terminal and is provided near a portion of the external terminal that extends from a laminate case, and pressing opposed laminate films of the laminate case with a heated thermocompression bonding jig so as to thermocompression-bond each of the opposed laminate films to the external terminal and seal the laminate case.

5 Claims, 5 Drawing Sheets

(51) Int. Cl.
*H01M 2/02* (2006.01)
*H01M 10/0525* (2010.01)
*H01G 11/84* (2013.01)

(56) References Cited

FOREIGN PATENT DOCUMENTS

| | | |
|---|---|---|
| JP | 2005-056815 A | 3/2005 |
| JP | 2006-099970 A | 4/2006 |
| JP | 2007-242548 A | 9/2007 |
| JP | 2009-272161 A | 11/2009 |
| JP | 2013-196930 A | 9/2013 |
| WO | WO 2012/157892 A2 | 11/2012 |

OTHER PUBLICATIONS

Written Opinion of the International Searching Authority issued for PCT/JP2014/069054, dated Sep. 2, 2014.

\* cited by examiner

METHOD FOR MANUFACTURING LAMINATED ELECTRICAL STORAGE DEVICE

CROSS REFERENCE TO RELATED APPLICATIONS

The present application is a continuation of International application No. PCT/JP2014/069054, filed Jul. 17, 2014, which claims priority to Japanese Patent Application No. 2013-151327, filed Jul. 22, 2013, the entire contents of each of which are incorporated herein by reference.

FIELD OF THE INVENTION

The present invention relates to a electrical storage device, and more particularly, to a method for manufacturing a laminated electrical storage device which has a structure such that an electrical storage element is housed in a case formed with the use of laminate films (laminate case), and an external terminal connected to the electrical storage element is extended from the laminate case.

BACKGROUND OF THE INVENTION

High-energy-density electrical storage devices as typified by lithium ion secondary batteries, lithium ion capacitors, and electric double layer capacitors include, for example, an electrical storage device (laminated electrical storage device) that has a structure such that a laminate case composed of laminate films (for example, laminate films of aluminum foil sandwiched between thermoplastic resin layers) houses therein an electric storage element configured in such a way that sheet-like positive electrode members and negative electrode members formed by coating sheet-like current collecting foil (aluminum foil or copper foil) with active materials (such as activated carbon, lithium composite oxide, or carbon) are laminated with separators interposed therebetween for preventing short circuits due to both the members in contact with each other; and an electrolyte.

Figure 6:
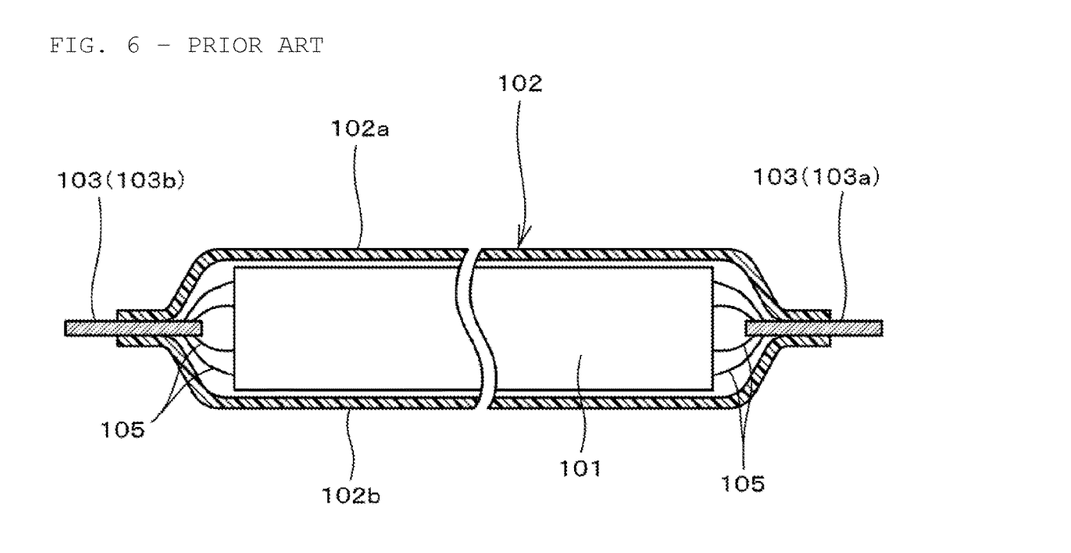
FIG. 6 is a diagram schematically illustrating an example of a conventional electrical storage device.

Now, as one of these electrical storage devices, there is a battery (laminated battery) that has a structure such that as schematically shown in FIG. 6, a battery element 101 is housed in a laminate case 102 composed of laminate films 102a, 102b, and external terminals 103 (positive electrode terminal 103a and negative electrode terminal 103b) connected through current collecting members 105 to the battery element 101 are extended externally from the laminate case 102.

In this battery, the laminate films 102a, 102b constituting the laminate case 102 are welded to the external terminals 103 to seal portions of the laminate case 102 from which the external terminals 103 are extended.

Figure 7:
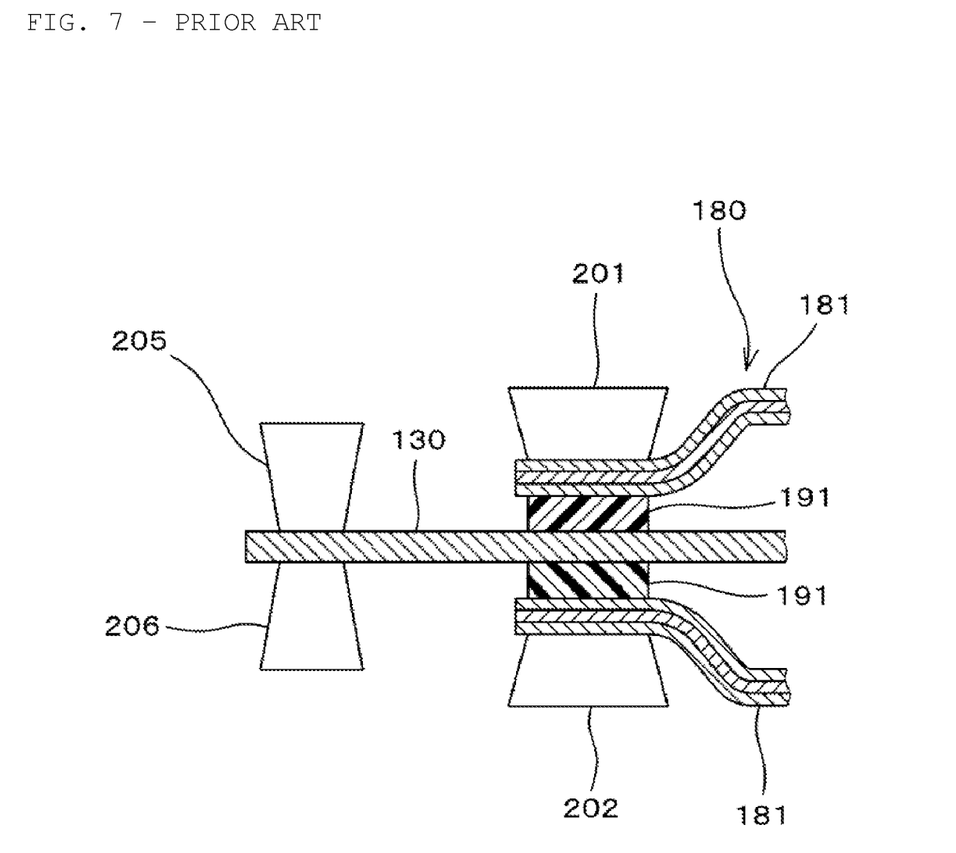
FIG. 7 is a diagram illustrating a method for manufacturing a conventional battery.

Further, as a method for sealing the portions of the laminate case from which the external terminals 103 are extended in the case of manufacturing such a battery, Patent Document 1 represents, for example, as shown in FIG. 7, a method of, in welding laminate films 181 of thermoplastic resin constituting a battery case 180 and the external terminals 130, pressing heating means 205, 206 against both the front and back surfaces of ends of the external terminals 130 to pre-warm sealants 191 of thermoplastic resin through the external terminals 130, and then pressing heated pressing jigs 201, 202 against both the front and back surfaces of ends of the battery case 180 to heat-seal the laminate films 181 to the external terminals 130 with the sealants 191 interposed therebetween, thereby sealing extensions of the external terminals 130 from a battery case 180.

However, in the case of this method, because the heating means (heat sources) are pressed against the external terminals, the external terminals may be damaged, or the external terminals against which the heating means (heat sources) are pressed may move to decrease the reliability of sealing the battery case with the sealants or damage members (for example, current collecting foil for positive electrodes or negative electrodes) connected to the other ends (the inner sides of the laminate case) of the external terminals.

In addition, Patent Document 2 represents a method (hot air method) of blowing hot air to preheat heat-sealing materials provided to cover predetermined regions of lead terminals, thereby shortening the time required for integrally heat-sealing sealant layers of laminate films and the heat-sealing materials of the lead terminals.

However, the hot air method may heat and damage members constituting batteries, such as separators because the hot air is extensively blown. Moreover, in the case of the hot air method, a heat source of heating pressure bonding means for thermocompression bonding and a heat source for heating air are required separately, thereby resulting in the problem of causing an increase in equipment cost or running cost.

Patent Document 1: Japanese Patent Application Laid-Open No. 2009-272161
Patent Document 1: Japanese Patent Application Laid-Open No. 11-312514

SUMMARY OF THE INVENTION

The present invention is intended to solve the problems mentioned above, and an object of the invention is to provide a method for manufacturing an electrical storage device, which is able to achieve reliable thermocompression bonding of laminate films to thermocompression-bonded regions of external terminals, without causing damage to the external terminals or the like, and without unnecessarily heating constituent members of the electrical storage device other than the external terminals and the laminate films constituting a laminate case, and capable of efficiently manufacturing a highly reliable electrical storage device with excellent sealing reliability.

In order to solve the problems mentioned above, the method for manufacturing a laminated electrical storage device according to the present invention includes heating an external terminal by a heater that is not in contact with the external terminal and is provided near a portion of the external terminal that extends from a laminate case, and pressing opposed laminate films of the laminate case with a heated thermocompression bonding jig so as to thermocompression-bond each of the opposed laminate films to the external terminal and seal the laminate case.

In addition, in the method for manufacturing a laminated electrical storage device according to the present invention, the laminate film is preferably configured to be thermocompression-bonded to the external terminal with a sealant layer interposed therebetween.

In the present invention, it is possible to adopt a configuration such that a sealant layer is interposed between the laminate film and the external terminal in order to further ensure sealing therebetween, and in such a case, heat from the heater is transferred through the external terminal to the sealant layer and the laminate film to heat (preheat) the sealant layer and laminate film constituting the part to be subjected to thermocompression bonding, thereby making it possible to further reliably seal the part of the laminate case from which the external terminal is extended.

In addition, in the method for manufacturing a laminated electrical storage device according to the present invention, the heater is preferably disposed to be opposed to both the front and back surfaces of the portion of the external terminal extended from the laminate case, and adapted to heat the external terminal from both the front and back surfaces of the external terminal.

While it is possible to provide the heater near any portion of the external terminal extended from the laminate case, providing the heater to be opposed to both the front and back surfaces of the portion extended from the laminate case makes it possible to supply a sufficient amount of heat, even without any contact with the external terminal, thereby making it possible to make the present invention more effective.

In the method for manufacturing a laminated electrical storage device according to the present invention, the external terminal extended from the laminate case is located in a region to which the laminate film is to be subjected to thermocompression bonding, the external terminal is heated by the heater provided near a portion of the external terminal extended from the laminate case, not to be brought into contact with the external terminal, and the region to which the laminate film is to be subjected to thermocompression bonding is pressed from both the front and back principal surfaces with a thermocompression bonding jig heated, to provide the laminate film thermocompression-bonded to the external terminal. Thus, while preventing the heater from damaging the external terminal in contact with the external terminal, the thermocompression-bonded part of the laminate case is made thermocompression-bonded in a short period of time, thereby making it possible to achieve reliable sealing.

In addition, the heater is located for the heating near the portion of the external terminal extended from the laminate case, thus making it possible to reliably heat only the portion required for thermocompression-bonding the laminate film, without heating any portion that desires no temperature increase as in the case of using a method of heating by blowing hot air, thereby succeeding in improving the reliability.

In addition, the thermocompression bonding is carried out while the heater heats the external terminals, thus making it possible to prevent heat applied for the thermocompression bonding from escaping through the external terminal, thereby efficiently carrying out thermocompression bonding.

In addition, a heat source for the heater and a heat source for the thermocompression bonding jig can be the same heat source, and the configuration of the equipment can be thus simplified to improve the reliability and reduce the cost.

It is to be noted that when laminate films are sandwiched and subjected to thermocompression bonding by thermocompression bonding jigs with an external terminal located between the laminate films, the amount of heat release is large because the external terminals are made of a metal with a high thermal conductivity, and when the temperature for thermocompression bonding is lowered due to heat release from the external terminals, the sealing properties will be degraded. On the other hand, when the temperature of a heat source for the thermocompression bonding jigs is increased in order to prevent the sealing properties from being degraded, the temperatures of thermocompression-bonded parts will be excessively increased, thereby excessively melting thermoplastic material constituting the laminate films, and creating the problem of causing defective insulation resistance, etc. In addition, thermocompression bonding at low temperature for a long period of time makes the time required for the thermocompression bonding longer, thereby resulting in the problem of decreasing the manufacturing efficiency.

In contrast, according to the present invention, the decrease in temperature due to heat release from the external terminal is prevented, thus eliminating the need to unnecessarily increase the temperature of a heat source for the thermocompression bonding jig and making the time required for the thermocompression bonding shorter, thereby making it possible to efficiently manufacture a highly reliable electrical storage device.

DETAILED DESCRIPTION OF THE INVENTION

Features of the present invention will be described in more detail below with reference to an embodiment of the present invention.

[Embodiment]

Figure 1:
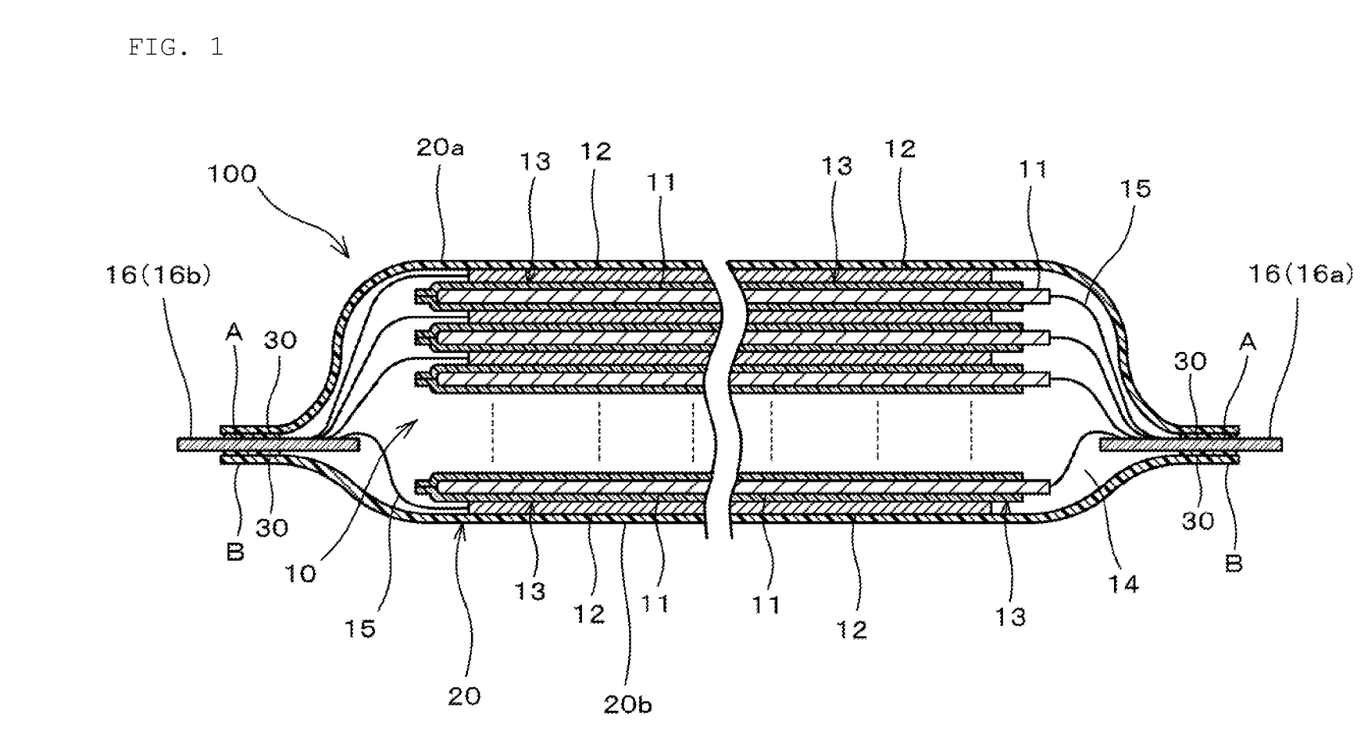
FIG. 1 is a front cross-sectional view illustrating the configuration of an electrical storage device (lithium ion secondary battery) according to an embodiment of the present invention.
Figure 2:
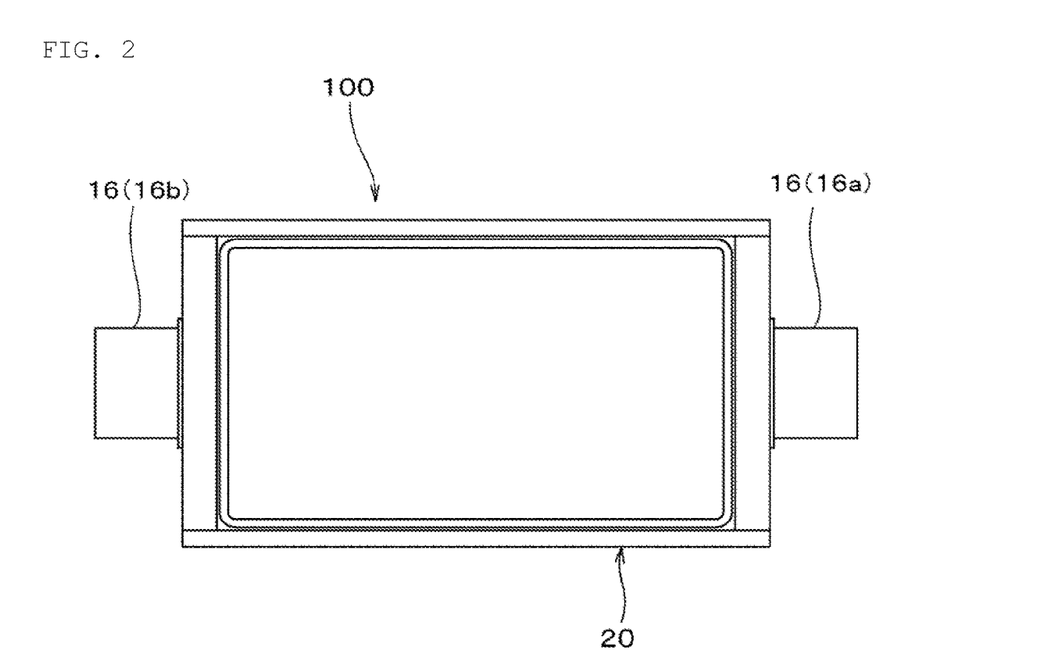
FIG. 2 is a plan view illustrating the configuration of an electrical storage device (lithium ion secondary battery) according to an embodiment of the present invention.

FIG. 1 is a front cross sectional view illustrating the configuration of an electrical storage device (lithium ion secondary battery) according to an embodiment of the present invention, and FIG. 2 is a plan view thereof.

Figure 3:
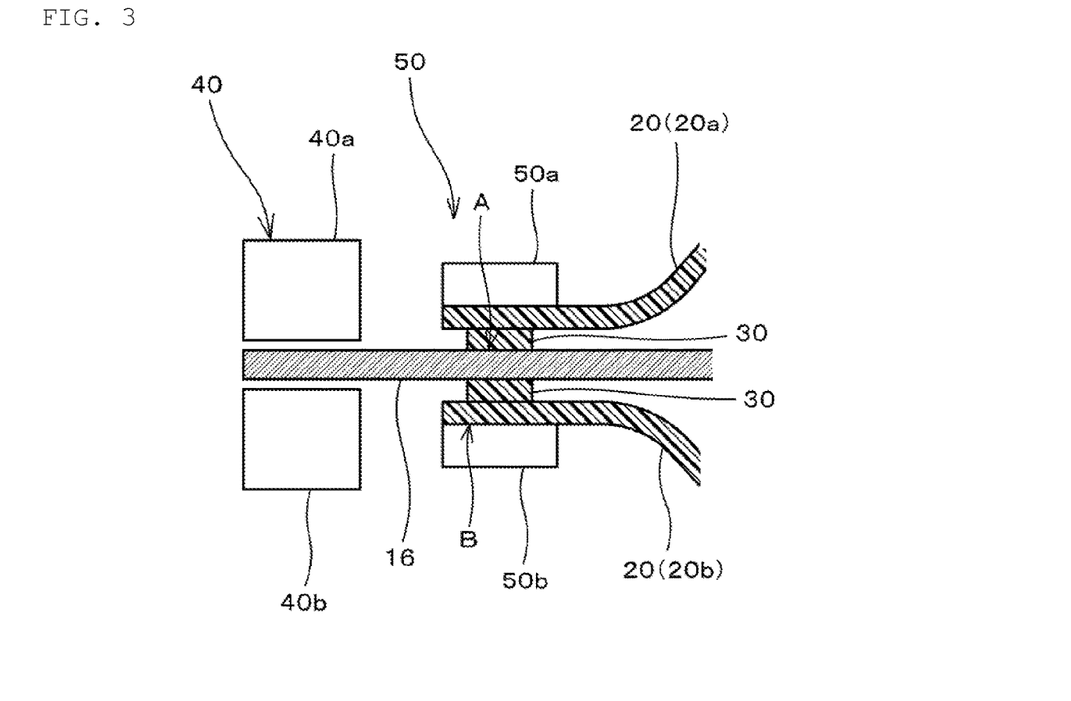
FIG. 3 is an enlarged front cross-sectional view of a main part, which illustrates a thermocompression bonding step for laminate films in the case of manufacturing a electrical storage device (lithium ion secondary battery) according to an embodiment of the present invention.

In addition, FIG. 3 is an enlarged front cross-sectional view of a main part, which illustrates a thermocompression bonding step for laminate films in the case of manufacturing a electrical storage device (lithium ion secondary battery) according to the embodiment of the present invention.

An electrical storage device (lithium ion secondary battery) 100 according to an embodiment of the present invention has a structure such that a laminated body (storage element) 10 of positive electrode members 11 and negative electrode members 12 laminated to be opposed to each other with separators (saclike separators) 13 interposed therebetween is housed in a laminate case (external capsule material) 20 along with an electrolyte 14, as shown in FIG. 1.

Further, the laminate case 20 has thermocompression-bonded parts formed such that a pair of laminate films 20a, 20b has peripheral edges joined to each other by thermocompression bonding.

It is to be noted that the laminate films 20a, 20b constituting the laminate case 20 are, for example, materials (laminated sheets) that have a laminated structure integrated by laminating an outer protective layer composed of a thermoplastic resin (such as polypropylene), a gas barrier layer composed of aluminum foil, and an inner adhesive layer composed of a thermoplastic resin (such as polypropylene).

In addition, this electrical storage device (lithium ion secondary battery) 100 includes an external terminal (positive electrode terminal) 16 (16a) connected to the positive electrode members 11 through a plurality of current collecting members 15, and led externally from one end of the laminate case 20, and likewise, an external terminal (negative electrode terminal) 16 (16b) connected to the negative electrode members 12 through a plurality of current collecting members 15, and led externally from the other end of the laminate case 20.

Further, in the lithium ion secondary battery 100 according to this embodiment, thermocompression-bonded regions A of the external terminals 16 (16a, 16b) extended from the laminate case 20 and terminal passing regions B of the laminate films 20a, 20b constituting the laminate case 20 are sealed by thermocompression bonding with sealant layers 30 interposed therebetween. The terminal passing regions B are portions of the thermocompression-bonded parts of the laminate films 20a, 20b.

Further, a non-aqueous electrolyte solution is used as the electrolyte 14 enclosed in the laminate case 20, and in this embodiment, a supporting salt prepared by dissolution in a non-aqueous solvent is used as the non-aqueous electrolyte solution. It is to be noted that the electrolyte may be a gel-like or solid-like electrolyte.

Next, a method for manufacturing the lithium ion secondary battery 100 will be described with reference to FIGS. 1 to 3.

(1) First, the laminated body (battery element) 10 is prepared which has the structure of a plurality of the positive electrode members 11 and a plurality of the negative electrode members 12 alternately laminated with the separator 13 interposed therebetween, and has the external terminals 16 (16a, 16b) connected through the current collecting members 15.

In this embodiment, structures provided with the sealant layers 30 composed of a heat-sealable resin (polypropylene) are used as the external terminals 16 (16a, 16b), so as to cover the thermocompression-bonded regions A as portions in contact with the terminal passing regions B, of the laminate films 20a, 20b.

It is to be noted that the sealant layers 30 are provided so as to go around the thermocompression-bonded regions A of the external terminals 16 (16a, 16b).

(2) Next, the pair of laminate films 20a, 20b constituting the laminate case 20 is prepared. In this embodiment, a gas barrier layer of aluminum foil provided with thermoplastic resin (polypropylene) layers on both front and back principal surfaces of the gas barrier layer are used as the laminate films 20a, 20b.

(3) Then, the laminated body (battery element) 10 provided with the external terminals 16 (16a, 16b) and the laminate films 20a, 20b are arranged to have a predetermined positional relationship. More specifically, the laminated body (battery element) 10 provided with the external terminals 16 (16a, 16b) and the laminate films 20a, 20b are set in such a manner that the laminated body 10 is housed in the laminate case 20 formed by applying thermocompression bonding to peripheral edges of the laminate films 20a, 20b, and portions of the external terminals 16 (16a, 16b) are extended externally from the laminate case 20.

(4) Then, the peripheral edges of the laminate films 20a, 20b are subjected to thermocompression bonding to each other. In this regard, when the peripheral edges of the laminate films 20a, 20b are subjected to thermocompression bonding to each other, the laminate films 20a, 20b constituting the laminate case 20 are located so as to be opposed to both the front and back surfaces of the thermocompression-bonded regions A of the external terminals 16 (16a, 16b) extended from the laminate case 20, which will be formed after the thermocompression bonding, as shown in FIG. 3. It is to be noted that the thermocompression-bonded regions A of the external terminals 16 are provided with the sealant layers 30 as described above.

Then, in the condition, heaters 40 (40a, 40b) provided on both the upper and lower sides of portions of the external terminals 16 extended from the laminate case 20, not to be brought into contact with the external terminals 16, heat the terminal passing regions B of the laminate films 20a, 20b, which serve as regions around the thermocompression-bonded regions A as thermocompression-bonded regions that are regions of the external terminals 16 to which the laminate films 20a, 20b are to be thermocompression-bonded. In this case, the sealant layers 30 are also heated.

Then, the terminal passing regions B of the laminate films 20a, 20b, which are heated (preheated) by the heaters 40 (40a, 40b), are pressed toward the external terminals 16 from both the front and back principal surfaces with thermocompression bonding jigs 50 (50a, 50b) heated to a predetermined temperature to provide the laminate films 20a, 20b thermocompression-bonded to (the thermocompression-bonded regions A of) the external terminals 16 with the sealant layers 30 interposed therebetween, thereby sealing the terminal passing regions B of the laminate case 20. Further, in this case, the terminal passing regions B of the laminate films 20a, 20b are made thermocompression-bonded to the thermocompression-bonded regions B of the external terminals 16 with the sealant layers 30 interposed therebetween, thus providing high sealing reliability.

It is to be noted that because it is necessary to inject an electrolyte (non-aqueous electrolyte solution) into the laminate case 20 in practice, the peripheral edges of the laminate films 20a, 20b constituting the laminate case 20 are partially (for example, one of the two sides through which no external terminal 16 is extended) kept open as an electrolyte solution inlet for injecting a non-aqueous electrolyte solution, while the other peripheral edges of the laminate case 20 are subjected to thermocompression bonding (heat sealing).

(5) Then, a nozzle is inserted from the electrolyte solution inlet to inject a non-aqueous electrolyte solution 14 (FIG. 1) into the laminate case 20, and the outer periphery of the laminate case 20, which is used as the electrolyte solution inlet, is then sealed, thereby making it possible to obtain the electrical storage device (lithium ion secondary battery) 100 structured as shown in FIG. 1.

In the embodiment described above, the heaters 40 (40a, 40b) provided near portions of the external terminals 16 extended from the laminate case 20, not to be brought into contact with the external terminals 16, heat the terminal passing regions B of the laminate films 20a, 20b through the external terminals 16, and the heated terminal passing regions B of the laminate films 20a, 20b are pressed from the both front and back principal surfaces with the thermocompression bonding jigs 50 (50a, 50b) heated to a predetermined temperature, thereby providing the laminate films 20a, 20b thermocompression-bonded to the external terminals 16. Thus, while preventing the heaters 40 (40a, 40b) from damaging the external terminals 16 in contact with the external terminals 16, the terminal passing regions B of the laminate case 20 are made thermocompression-bonded to the external terminals 16 in a short period of time, thereby making it possible to achieve reliable sealing.

As a result, it becomes possible to manufacture the highly reliable electrical storage device (lithium ion secondary battery) 100 efficiently.

In addition, the thermocompression bonding is carried out while the heaters (40a, 40b) heat the external terminals 16, thus making it possible to prevent heat applied for the thermocompression bonding from escaping through the external terminals 16, and efficient thermocompression bonding can be carried out.

Furthermore, the method according to the embodiment makes it possible to reliably heat only portions required for thermocompression-bonding the laminate films 20a, 20b, without heating any portion that desires no temperature increase as in the case of using a method of heating by blowing hot air, thereby succeeding in improving the reliability.

In addition, in this embodiment, the heaters 40 (40a, 40b) are arranged to be opposed to both the front and back surfaces of portions of the external terminals 16 extended from the laminate case 20, in such a way that the external terminals 16 are heated from both the front and back surfaces of the external terminals 16, and a sufficient amount of heat can be thus supplied even without any contact with the external terminals 16.

In addition, a heat source for the heaters 40 and a heat source for the thermocompression bonding jigs 50 can be the same heat source, and the configuration of the equipment can be thus simplified to improve the reliability and reduce the cost.

[Modification Example]

Figure 4:
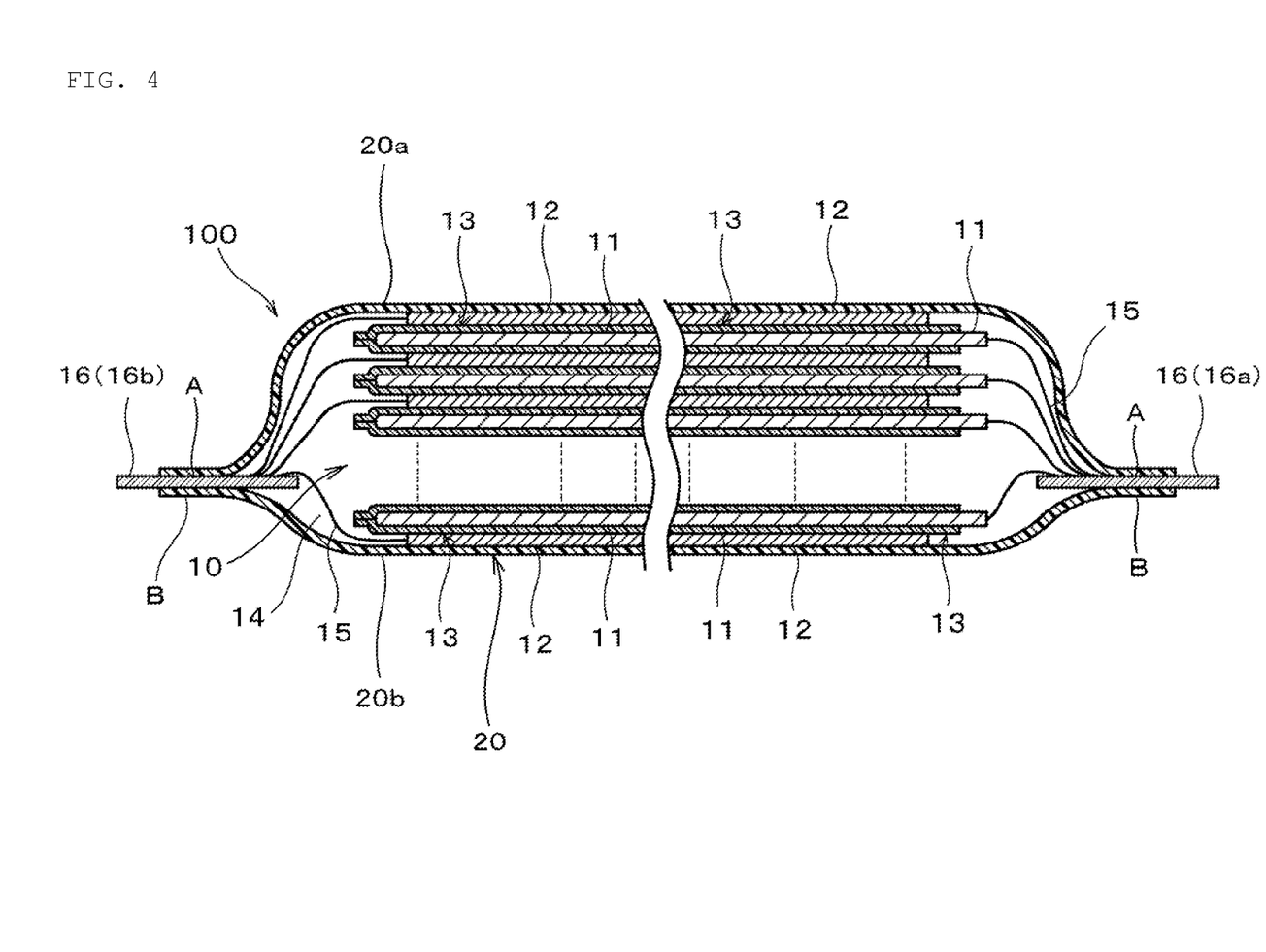
FIG. 4 is a diagram illustrating a modification example of an electrical storage device (lithium ion secondary battery) according to an embodiment of the present invention.
Figure 5:
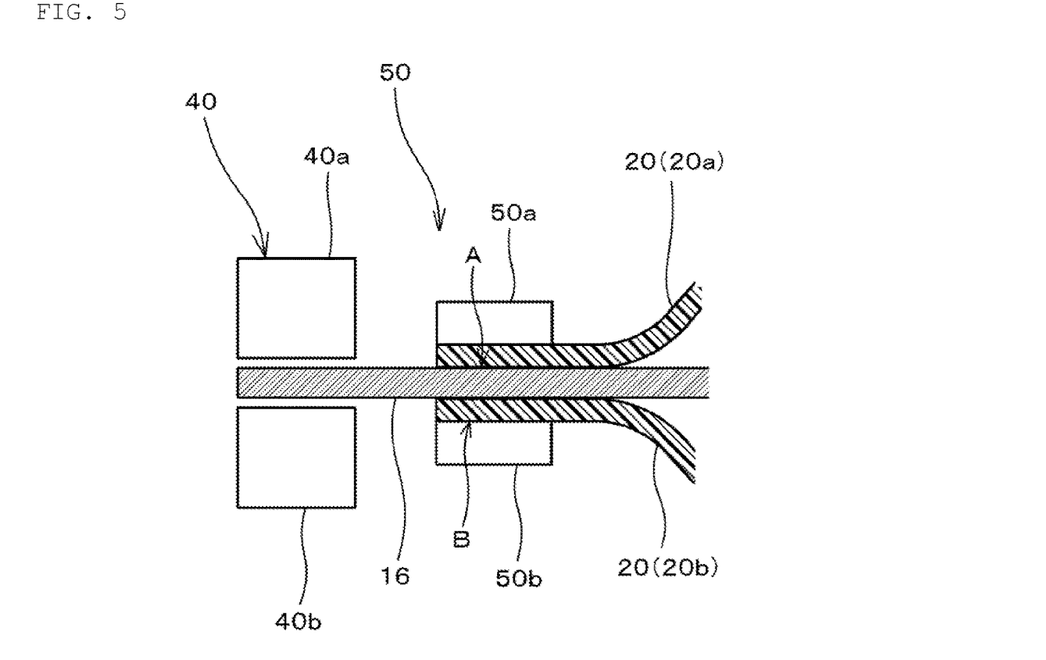
FIG. 5 is an enlarged front cross-sectional view of a main part, which illustrates a thermocompression bonding step for laminate films in the case of manufacturing a electrical storage device (lithium ion secondary battery) according to a modification example of the present invention.

FIG. 4 is a front cross-sectional view illustrating a modification example of a electrical storage device (lithium ion secondary battery) according to an embodiment of the present invention, and FIG. 5 is an enlarged front cross-sectional view of a main part, which illustrates a thermocompression bonding step for laminate films in the case of manufacturing the electrical storage device (lithium ion secondary battery) in FIG. 4.

While a method for manufacturing the electrical storage device (lithium ion secondary battery) in which the laminate films 20a, 20b are subjected to thermocompression bonding to the external terminals 16 with the sealant layers 30 interposed therebetween has been described as an example in the embodiment described above, the present invention is also able to be applied to a case of manufacturing a electrical storage device (lithium ion secondary battery) including no sealant layer as shown in FIG. 4, and in such a case, an effect can be achieved as in the case of Embodiment 1 described above. It is to be noted that the parts denoted by the same reference symbols as in FIG. 1 refer to the same or corresponding parts in FIG. 4.

It is to be noted that in the case of manufacturing a electrical storage device (lithium ion secondary battery) including no sealant layer, for example, as shown in FIG. 5, laminate films 20a, 20b constituting a laminate case 20 are located to be opposed to both the front and back surfaces of thermocompression-bonded regions A of external terminals 16 extended from the laminate case 20, which are not provided with any sealant layer.

Next, heaters 40 (40a, 40b) provided near portions of the external terminals 16 extended from the laminate case 20, not to be brought into contact with the external terminals 16, heat terminal passing regions B of the laminate films 20a, 20b through the external terminals 16.

Then, in the condition, the terminal passing regions B of the laminate films 20a, 20b are pressed from both the front and back principal surfaces, and thermocompression-bonded to the thermocompression-bonded regions A of the external terminals 16, with thermocompression bonding jigs 50 (50a, 50b) heated to a predetermined temperature.

Further, in the other respects, in accordance with the same procedure as in the case of the embodiment described above, a electrical storage device (lithium ion secondary battery) can be obtained as shown in FIG. 4.

Also in the case of the modification example, the heaters (40a, 40b) are kept from coming into contact with the external terminals 16, and the terminal passing regions B of the laminate case 20 can be thus sealed reliably while preventing the heaters (40a, 40b) from damaging the external terminals 16 in contact with the external terminals 16.

It is to be noted that while the examples of lithium ion secondary batteries have been described as the electrical storage device in the embodiment and the modification example, the present invention is able to be applied to not only batteries but also lithium ion capacitors, electric double layer capacitors, etc.

The present invention is not to be considered limited to the embodiment and modification example even in any other respect, but various applications and modifications can be made within the scope of the invention, in regard to the specific shapes and structures of the laminate case and external terminals, the configurations of the heaters and thermocompression bonding jigs, etc.

DESCRIPTION OF REFERENCE SYMBOLS

| | |
|---|---|
| 10 | laminated body (battery element) |
| 11 | positive electrode member |
| 12 | negative electrode member |
| 13 | separator |
| 14 | electrolyte |
| 16 (16a, 16b) | external terminal |
| 15 | current collecting member |
| 20 | laminate case |
| 20a, 20b | laminate film |
| 30 | sealant layer |
| 40 (40a, 40b) | heater |
| 50 (50a, 50b) | thermocompression bonding jig |
| A | thermocompression-bonded region |
| B | terminal passing region |

The invention claimed is:

1. A method for manufacturing a laminated electrical storage device, the method comprising:

heating an external terminal by a heater that is not in contact with the external terminal and is provided so as to be opposed to a first principal surface of the external terminal that extends from a laminated case, wherein the terminal has principal surfaces and secondary surfaces, the principal surfaces being wider than the secondary surfaces; and pressing opposed laminate films of the laminate case with a heated thermocompression bonding jig so as to thermocompression-bond each of the opposed laminate films to the external terminal and seal the laminate case.

2. The method for manufacturing a laminated electrical storage device according to claim 1, further comprising providing a sealant layer between the laminate films and the external terminal.

3. The method for manufacturing a laminated electrical storage device according to claim 2, wherein the sealant layer is a heat-sealable resin.

4. The method for manufacturing a laminated electrical storage device according to claim 2, wherein the heater is disposed so as to be opposed to both the first principal surface and a second principal surface of the external terminal extending from the laminate case, and heats the external terminal from both the first and second principal surfaces of the external terminal.

5. The method for manufacturing a laminated electrical storage device according to claim 1, wherein the heater is disposed so as to be opposed to both the first principal surface and a second principal surface of the external terminal extending from the laminate case, and heats the external terminal from both the first and second principal surfaces of the external terminal.

* * * * *